United States Patent
Hashimoto et al.

(10) Patent No.: US 9,329,581 B2
(45) Date of Patent: May 3, 2016

(54) SAFETY CONTROL SYSTEM

(71) Applicant: OMRON Corporation, Kyoto (JP)

(72) Inventors: Minoru Hashimoto, Kusatsu (JP); Teruyuki Nakayama, Kyoto (JP)

(73) Assignee: OMRON CORPORATION, Kyoto-shi (JP)

( * ) Notice: Subject to any disclaimer, the term of this patent is extended or adjusted under 35 U.S.C. 154(b) by 822 days.

(21) Appl. No.: 13/656,992

(22) Filed: Oct. 22, 2012

(65) Prior Publication Data

US 2013/0113301 A1 May 9, 2013

(30) Foreign Application Priority Data

Nov. 8, 2011 (JP) .................................. 2011-244306

(51) Int. Cl.
| | | |
|---|---|---|
| H01H 19/64 | (2006.01) | |
| H01H 31/10 | (2006.01) | |
| H01H 33/52 | (2006.01) | |
| H01H 33/59 | (2006.01) | |
| H01H 47/00 | (2006.01) | |
| H01H 85/46 | (2006.01) | |
| G05B 9/02 | (2006.01) | |

(52) U.S. Cl.
CPC ............... *G05B 9/02* (2013.01); *Y10T 307/747* (2015.04)

(58) Field of Classification Search
CPC ............................... G05B 9/02; Y10T 307/747
USPC .................... 307/113, 326, 116, 125
See application file for complete search history.

(56) References Cited

U.S. PATENT DOCUMENTS

| | | | | |
|---|---|---|---|---|
| 6,787,940 | B2* | 9/2004 | Pullmann | .................. G05B 9/03 307/116 |
| 7,116,069 | B1* | 10/2006 | Holterman | ......... G05B 19/0428 318/400.21 |
| 7,610,119 | B2* | 10/2009 | Abe | .......................... G05B 9/03 307/113 |
| 7,948,391 | B2* | 5/2011 | Pullmann | ............. H01H 47/002 307/112 |
| 2007/0182255 | A1* | 8/2007 | Schneiderheinze et al. | ........................ G05B 9/02 307/125 |

FOREIGN PATENT DOCUMENTS

| | | |
|---|---|---|
| JP | 9-212206 A | 8/1997 |
| JP | 2003-504863 A | 2/2003 |
| WO | 01-04923 A | 1/2001 |

* cited by examiner

*Primary Examiner* — Thienvu Tran
*Assistant Examiner* — Rasem Mourad
(74) *Attorney, Agent, or Firm* — Nutter McClennen & Fish LLP; John J. Penny, Jr.

(57) ABSTRACT

A safety control system is provided, which is capable of monitoring many more drive circuits by using a single controller without modifying the configurations of the controller and the drive circuit. An a-contact of a relay is electrically connected between a FB (feedback) output terminal and a FB input terminal of a safety controller. A b-contact of the relay is electrically connected between a signal output terminal (safety output (1) terminal) of the safety controller and a signal input terminal (safety input (1) terminal) of a safety drive circuit. A coil of the relay is connected to a FB monitor output terminal of the safety drive circuit. No factor in a large voltage drop is present between the FB output terminal and the FB input terminal, thus making it possible to monitor many more drive circuits by using a single controller.

4 Claims, 12 Drawing Sheets

| SIGNAL | STATE | | | |
|---|---|---|---|---|
| SAFETY INPUT 1 | High | High | Low | Low |
| SAFETY INPUT 2 | High | Low | High | Low |
| FB MONITOR | OFF | ON | ON | ON |
| OUTPUT OF SAFETY DRIVE CIRCUIT | OUTPUT IS PERMITTED | OUTPUT IS CUT-OFF | OUTPUT IS CUT-OFF | OUTPUT IS CUT-OFF |

| SIGNAL | STATE | | | |
|---|---|---|---|---|
| SAFETY INPUT 1 | High | High | Low | Low |
| SAFETY INPUT 2 | High | Low | High | Low |
| FB MONITOR | OFF | OFF | OFF | ON |
| OUTPUT OF SAFETY DRIVE CIRCUIT | OUTPUT IS PERMITTED | OUTPUT IS CUT-OFF | OUTPUT IS CUT-OFF | OUTPUT IS CUT-OFF |

SAFETY CONTROL SYSTEM

BACKGROUND OF THE INVENTION

1. Technical Field

The present invention relates to a safety control system, in particular, a configuration in which a single controller monitors a plurality of drive circuits.

2. Related Art

In order to establish work safety in production sites, safety control systems are constructed, in which electricity is supplied to a power source, such as a motor, for mechanical equipment in the state where safety is secured. Such a safety control system includes, for example, a relay unit and a controller.

FIG. 9 is a view illustrating an example of a configuration of a typical safety control system. Referring to FIG. 9, a motor 102 serves as a power source and is operated by being supplied with three-phase ACs from an AC power supply 101. This motor 102 is used to, for example, drive various mechanical devices in a factory. A safety control system 151 supplies drive electricity to the motor 102 from the AC power supply 101 or cuts off the drive electricity thereto.

The safety control system 151 includes a safety controller 110, an emergency stop switch 111, and contactors 112 and 113. The emergency stop switch 111 is illustrated in FIG. 9 as an example of an input apparatus connected to the safety controller 110. The input apparatus may also be a light curtain or a door switch. The contactors 112 and 113 are connected to a power-supply line 103 between the AC power supply 101 and the motor 102. The safety controller 110 has a function of monitoring the contactors 112 and 113.

FIG. 10 is a view to concretely explain a configuration for monitoring contactors. Referring to FIGS. 9 and 10, the power-supply line 103 includes lines L1, L2 and L3 corresponding to respective phases of the three-phase ACs. The motor 102 is connected to the power-supply line 103 through an a-contact 112a of the contactor 112, an a-contact 113a of the contactor 113, and a circuit breaker 105.

The safety controller 110 is provided with a FB output terminal 121 and a FB input terminal 122. Note that the term "FB" represents feedback. A b-contact 112b of the contactor 112 and a b-contact 113b of the contactor 113 are connected in series to each other between the FB output terminal 121 and the FB input terminal 122. Note that the emergency stop switch 111 is omitted in FIG. 10, in order to concentrate on describing the configuration of the contactors 112 and 113.

In general, with regard to a switch, such as a relay or a contactor, which opens or closes the contact by feeding a current to the exciting coil, a term "a-contact" refers to a contact that is opened when no current flows through the exciting coil, but is closed when a current flows therethrough. Meanwhile, the term "b-contact" refers to a contact that is closed when no current flows through the exciting coil, but is opened when a current flows therethrough. The above definitions of the "a-contact" and "b-contact" also apply to the following description.

In the configuration illustrated in FIGS. 9 and 10, the a-contacts 112a and 113a of the contactors 112 and 113, respectively, directly operate distribution of a current to a hazard source (corresponding to, for example, the motor 102 of FIG. 11). In FIG. 9, a FB input represents a signal to be inputted to the safety controller 110. This FB input is inputted to the safety controller 110, so that the safety controller 110 can confirm that the a-contacts 112a and 113a of the contactors 112 and 113, respectively, are normally operating without welding failure. If the a-contact of any of the contactors 112 and 113 is welded, the safety controller 110 cannot cut off a current to the motor 102. Accordingly, it is necessary to detect the failure, such as the welding, of the a-contacts 112a and 113a of the contactors 112 and 113, respectively.

When a safety control system, such as that illustrated in FIGS. 9 and 10, is designed, contactors having a mechanical restriction in which the a-contact and the b-contact operate in relation to each other is used for each of the contactors 112 and 113. In a contactor of this type, the b-contact is opened whenever the a-contact is closed, whereas the b-contact is closed whenever the a-contact is opened.

As illustrated in FIG. 10, the b-contacts 112b and 113b of the contactors 112 and 113, respectively, are connected in series to the FB input terminal 122 of the safety controller 110. The safety controller 110 outputs a safety output, which is a signal for permitting the operation of the contactors 112 and 113. The a-contacts 112a and 113a of the contactors 112 and 113, respectively, are closed in response to this safety output.

Before outputting a safety output to the contactors 112 and 113, the safety controller 110 confirms that a feedback loop created by the b-contacts 112b and 113b of the contactors 112 and 113, respectively, has been closed. This operation corresponds to a FB monitor performed by the safety controller 110. If it is confirmed that the feedback loop has not been closed, or has been opened, the safety controller 110 does not turn on the safety output.

Assuming a case where an a-contactor in at least one of the contactors 112 and 113 is welded, a b-contact in the contactor is forcibly opened. This causes the feedback loop to be opened, so that the user can be aware of the failure. The reason why two contactors are provided is, when the welding of an a-contact is detected in one contactor, to cause the a-contact in the other contactor to be opened. It is believed that the possibility is low, in which both a-contacts 112a and 113a of the contactors 112 and 113, respectively, are welded. Therefore, arranging two contactors makes it possible to cut off the current to the motor 102 more reliably.

To give an example, JP 09-212206 A discloses a control device for a control route. This control device controls, for example, a brushless motor or a DC motor.

To give another example, JP 2003-504863 W discloses a method and system for driving a solenoid. On the basis of the difference between a desired current flow in a solenoid and an actual current flow therein, the solenoid driver controls the actual current flow in the solenoid.

FIG. 11 is a view illustrating another example of a configuration of a typical safety control system. Referring to FIGS. 9 and 11, a safety control system 152 includes a safety drive circuit 114, instead of the contactors 112 and 113. This safety drive circuit 114 may be, for example, a motor control apparatus, such as a servo driver, an inverter, or the like. A safety controller 110 monitors the FB of the safety drive circuit 114, similar to the safety control system 151 illustrated in FIG. 9.

FIG. 12 is a view to explain a feedback loop for controlling a contactor. FIG. 13 is a view to explain a feedback loop in a safety drive circuit. Referring to FIGS. 12 and 13, the b-contact of a contactor (which is exemplified by a b-contact 112b in FIG. 12) is connected between a FB output terminal (OUT) 121 and a FB input terminal (IN) 122 in the safety controller 110. Meanwhile, in many similar cases, the output signal from a semiconductor element 116 is used as a feedback monitor outputted from the safety drive circuit 114. The reason why a semiconductor element is used is to prolong the lifetime of the part that is responsible for a signal output function.

The FB output terminal 121 of the safety controller 110 outputs a constant voltage (for example, DC 24 V). To the FB input terminal 122 of the safety controller 110, a voltage is inputted through the b-contact of the contactor or the semiconductor element. If the input voltage is at a high level, the safety controller 110 determines that the feedback loop has been closed. Otherwise, if the input voltage is at a low level, it determines that the feedback loop has been opened.

FIG. 14 is a view to more concretely explain a connection between the safety controller and the safety drive circuit illustrated in FIG. 13. Referring to FIG. 14, the safety controller 110 includes the FB output terminal 121, the FB input terminal 122, a safety output (1) terminal 123, a safety output (2) terminal 124, and a safety input terminal 126. Each of the safety output (1) terminal 123 and the safety output (2) terminal 124 is a terminal that outputs a signal for permitting the operation of the safety drive circuit 114 (referred to as a "safety output").

The safety drive circuit 114 includes a semiconductor element 116, a voltage input terminal 131, a FB monitor output terminal 132, a safety input (1) terminal 133, and a safety input (2) terminal 134. The semiconductor element 116 is provided between the voltage input terminal 131 and the FB monitor output terminal 132. Each of the safety input (1) terminal 133 and the safety input (2) terminal 134 is a terminal that inputs a safety output to the safety drive circuit 114 from the safety controller 110. A signal to be inputted to either of the safety input (1) terminal 133 and the safety input (2) terminal 134 is referred to as a "safety input".

The safety output (1) terminal 123 of the safety controller 110 is connected directly to the safety input (1) terminal 133 of the safety drive circuit 114. The safety output (2) terminal 124 of the safety controller 110 is connected directly to the safety input (2) terminal 134 of the safety drive circuit 114. The FB output terminal 121 of the safety controller 110 is connected directly to the voltage input terminal 131 of the safety drive circuit 114. The FB input terminal 122 of the safety controller 110 is connected directly to the FB monitor output terminal 132 of the safety drive circuit 114.

The FB output terminal 121 of the safety controller 110 outputs a signal of a high level. The safety controller 110 detects that a signal having been inputted to the FB input terminal 122 of the safety controller 110 is a signal of a high level. In this case, the safety output (1) terminal 123 and the safety output (2) terminal 124 of the safety controller 110 output respective signals of a high level. The reason why both of the safety output (1) terminal 123 and the safety output (2) terminal 124 in the safety controller 110 output signals of a high level is to increase the reliability of the safety output.

If both safe inputs 1 and 2 having been inputted to the safety drive circuit 114 are at a high level, the safety drive circuit 114 turns off the FB monitor output. Otherwise, if either of the safety inputs 1 and 2 is not at a high level, namely, at least one of them is at a low level, the FB monitor output is turned on.

FIG. 15 is a timing chart to explain the operation of the safety control system illustrated in FIG. 14. Referring to FIGS. 14 and 15, first, in an initial state (a state prior to a time t11), both of the safety outputs 1 and 2 in the safety controller 110 (which will be described collectively as a "safety output 1/2" in FIG. 15) are at a low level. Although not illustrated in figures, because the safety output 1/2 is at the low level, the FB monitor output is in an "ON" state. Thus, the FB monitor output terminal 132 of the safety drive circuit 114 outputs a voltage.

At a time t11, next, the input signal (safety input) that is inputted to the safety input terminal 126 of the safety controller 110 becomes a high level. In response to this, the safety input also becomes a high level.

At a time t12, subsequently, the safety controller 110 detects that a signal inputted to the FB input terminal 122 has been a signal of a high level. With this, at a time t13, the safety output 1/2 of the safety controller 110 becomes a high level. Accordingly, the safety input 1/2 of the safety drive circuit 114 also becomes a high level. Once the safety input 1/2 becomes the high level, the safety drive circuit 114 turns off the semiconductor element 116. As a result, at a time t14, the FB monitor output is turned off.

However, the semiconductor element 116 causes a voltage drop in the feedback loop of the safety drive circuit. In the case where a single safety controller 110 administrates a plurality of safety drive circuits 114, individual semiconductor elements 116 of the safety drive circuits 114 are directly connected in series to the feedback input terminal of the safety controller 110, as illustrated in FIG. 16. This configuration causes the remarkable voltage drop in the feedback loop of the safety controller 110, so that an input voltage at the FB input terminal 122 is greatly reduced.

When an input voltage at the FB input terminal 122 is considerably low, the safety controller 110 may determine that the feedback loop has been opened. In this case, the safety controller 110 does not turn on the safety output. As a result, it may be impossible for the safety controller 110 to permit the operations of the safety drive circuits 114 even when the safety drive circuits 114 can normally operate. In order to prevent such a great voltage drop from arising in the feedback loop, a configuration has been employed so far, in which only a limited number of safety drive circuits 114 are connected to a safety controller 110.

As a solution to the above disadvantage, it is contemplated that the configuration of a safety controller or a safety drive circuit needs to be modified. However, this solution may involve a risk of increasing the number of man-hours devoted to the development along with the design modification. As a result, this leads to an increase in the overall cost. Moreover, it is necessary to confirm and certify that the modified safety controller or safety drive circuit meets target safety specifications. In order to do so, additional cost and time may be required.

As for the above-mentioned patent documents, JP 09-212206 A mentions a voltage drop in a servo driver (see the paragraph "0043" in the specification of JP 09-212206 A), but lacks the description about the above disadvantage. Likewise, JP 2003-504863 W does not describe this disadvantage.

An object of the present invention is to provide a safety control system that is capable of monitoring many more drive circuits by using a single controller without modifying the configurations of the controller and the drive circuits.

SUMMARY

In accordance with one aspect of the present invention, a safety control system includes: a controller; and at least one drive circuit configured to drive a power source. The controller includes: a feedback output terminal and a feedback input terminal which create a feedback loop that allows the controller to monitor a state of the at least one drive circuit; and a signal output terminal through which the controller outputs an output signal for permitting the at least one drive circuit to drive the power source. The drive circuit includes: a signal input terminal through which the output signal outputted from the signal output terminal of the controller is inputted to the drive circuit; a monitor output terminal through which the drive circuit outputs a monitor voltage indicating the state of the drive circuit from the drive circuit to the controller; a semiconductor element which generates the monitor voltage to be outputted through the monitor output terminal; and a voltage input terminal through which a voltage for causing the semiconductor element to generate the monitor voltage is inputted to the semiconductor element. The drive circuit outputs the monitor voltage through the monitor output terminal, before the output signal from the controller is inputted to the signal input terminal. The safety control system further includes at least one first relay. The at least one first relay includes: a first coil; and a first contact and a second contact which both are operated in relation to each other in a complementary manner. The at least one first relay closes the first contact and opens the second contact, when a current flows through the first coil, but opens the first contact and closes the second contact, when no current flows through the first coil. The first contact of the first relay is electrically connected to the feedback output terminal and the feedback input terminal of the controller. The second contact of the first relay is electrically connected to the signal output terminal of the controller and the signal input terminal of the drive circuit. The first coil of the first relay is electrically connected to the monitor output terminal of the drive circuit.

It is preferable for the controller to further include an auxiliary output terminal through which the controller outputs an auxiliary output signal that is synchronized with the output signal. After confirming that the feedback loop has been closed, the controller outputs the output signal and the auxiliary output signal through the signal output terminal and the auxiliary output terminal, respectively. The safety control system further includes a second relay. The second relay includes: a second coil; and a third contact which is opened when a current flows through the second coil but is closed when no current flows through the second coil. The first coil of the first relay and the third contact of the second relay are electrically connected in series to one another between the monitor output terminal of the drive circuit and the ground. The second coil of the second relay is electrically connected to the auxiliary output terminal of the controller and the ground.

It is preferable for the at least one drive circuit to include a plurality of drive circuits. The at least one first relay includes a plurality of first relays provided corresponding to the plurality of drive circuits. The respective first contacts of the plurality of the first relays are electrically connected in series to one another between the feedback output terminal and the feedback input terminal of the controller. Each of the second contacts of the plurality of the first relays is electrically connected to the signal output terminal of the controller and the signal input terminal of one of the plurality of drive circuits which corresponds to each first relay. The respective first coils of the plurality of the first relays are electrically connected to the monitor output terminals of the corresponding drive circuits, and are connected in parallel to the third contact of the second relay.

It is preferable for each of the first coils of the first relays to be electrically connected to the ground and the monitor output terminal of a corresponding one of the drive circuits.

It is preferable for the at least one drive circuit to include a plurality of drive circuits. The at least one first relay includes a plurality of first relays provided corresponding to the plurality of drive circuits. The respective first contacts of the plurality of the first relays are electrically connected in series to one another between the feedback output terminal and the feedback input terminal of the controller. The second contacts of the plurality of the first relays are electrically connected in series to one another, and each second contact is electrically connected to the signal output terminal of the controller and the signal input terminal of one of the drive circuits which corresponds to each first relay.

With the present invention, it is possible to provide a safety control system which is capable of monitoring many more drive circuits by using a single controller without modifying the configurations of the controller and the drive circuit.

DETAILED DESCRIPTION

Figures 1, 2:
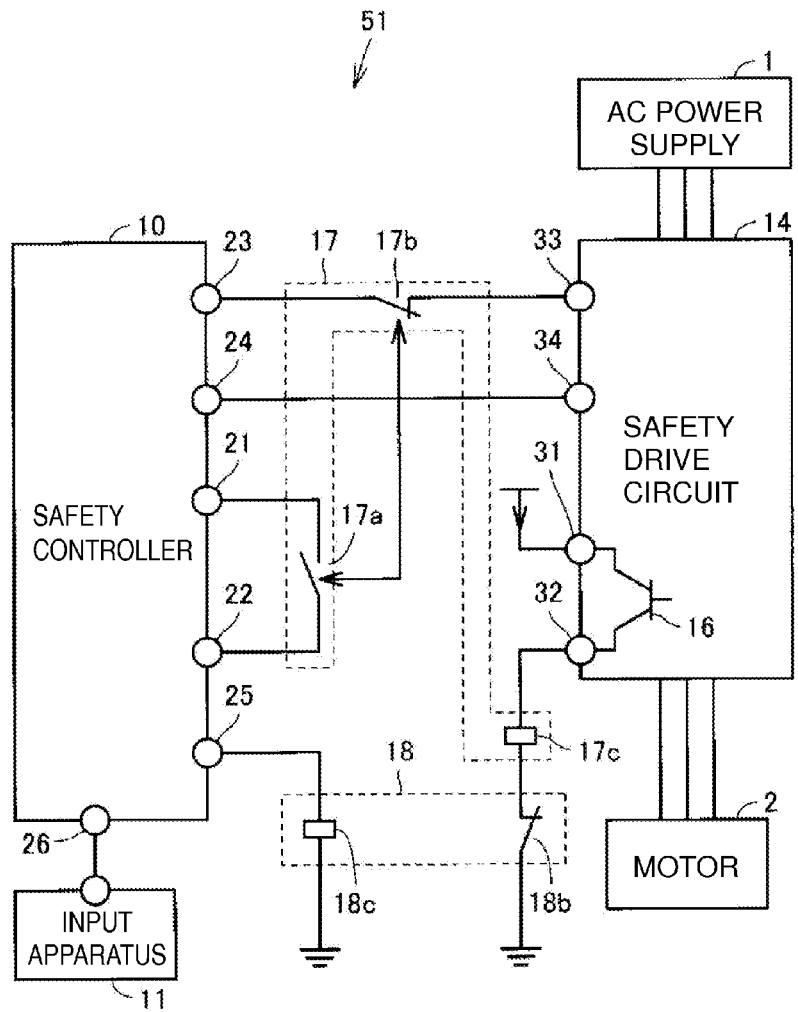
FIG. 1 is a view illustrating an example of a configuration of a safety control system according to a first embodiment of the present invention.
FIG. 2 is a view to explain an operation of a safety drive circuit illustrated in FIG. 1.

Hereinafter, embodiments of the present invention will be described in detail, with reference to the accompanying drawings. Note that the same or equivalent components in the drawings will be given the same reference numbers, and no descriptions thereof will be repeated.

(First Embodiment)

FIG. 1 is a view illustrating an example of a configuration of a safety control system according to a first embodiment of the present invention.

Referring to FIG. 1, a safety control system 51 according to the first embodiment includes a safety controller 10, an input apparatus 11, a safety drive circuit 14, and relays 17 and 18. The input apparatus 11 is, for example, an emergency stop switch, but instead, it may be any other device having a function of inputting a signal to the safety controller 10 in accordance with a user's operation. For example, a light curtain or a door switch may be applied to the input apparatus 11. In addition, the input apparatus 11 is not limited to a single unit, but may be implemented by a combination of multiple units.

A motor 2 serves as a power source, and operates by being supplied with three-phase ACs from an AC power supply 1. The motor 2 is driven by the safety drive circuit 14. The safety drive circuit 14 supplies drive electricity to the motor 2 from the AC power supply 1, and cuts off the electricity thereto. The safety drive circuit 14 may be a motor control apparatus, such as a servo driver, an inverter, or the like. The safety controller 10 has a function of monitoring the safety drive circuit 14. Note that the AC power supply 1 may be replaced by a DC power supply.

In the description herein, the terms "safety controller" and "safety drive circuit" are used. However, note that any of the "safety controller" and "safety drive circuit" does not represent any special device. The present invention is applicable to any given control device (controller) and driving device (drive circuit or driver), as long as they conform to predetermined safety specifications.

The safety controller 10 includes a FB (feedback) output terminal 21, a FB input terminal 22, a safety output (1) terminal 23, a safety output (2) terminal 24, an auxiliary output terminal 25, and a safety input terminal 26. The FB output terminal 21 and the FB input terminal 22 are terminals that create a feedback loop through which the safety controller 10 monitors the state of the safety drive circuit 14. In this embodiment, the expression "the state of the safety drive circuit 14" refers to a state where the output is permitted or cut off (for example, see FIG. 2). Each of the safety output (1) terminal 23 and the safety output (2) terminal 24 is a terminal, through which the safety controller 10 outputs a signal (referred to as a "safety output") for permitting an operation of the safety drive circuit 14. The auxiliary output terminal 25 is a terminal, through which the safety controller 10 outputs a signal (referred to as an "auxiliary output") that is synchronized with the safety output. The safety input terminal 26 is a terminal, through which a signal (referred to as a "safety input") from the input apparatus 11 is inputted to the safety controller 10. The input apparatus 11 is connected to the safety input terminal 26 of the safety controller 10.

The safety drive circuit 14 includes a semiconductor element 16, a voltage input terminal 31, a FB monitor output terminal 32, a safety input (1) terminal 33, and a safety input (2) terminal 34. The safety input (1) terminal 33 and the safety input (2) terminal 34 are terminals, through which safety outputs that have been outputted from the safety output (1) terminal 23 and the safety output (2) terminal 24, respectively, of the safety controller 10 are inputted to the safety drive circuit 14. A signal that is inputted to either of the safety input (1) terminal 33 and the safety input (2) terminal 34 is called a "safety input".

As long as at least one set of a safety output terminal of the safety controller 10 and a safety input terminal of the safety drive circuit 14 are provided, the present invention can be applied. However, by providing two or more sets of a safety output terminal and a safety input terminal as in this embodiment, the reliability of the safety control system can be further increased.

The semiconductor element 16 is provided between the voltage input terminal 31 and the FB monitor output terminal 32. The FB monitor output terminal 32 is a monitor output terminal, through which the safety drive circuit 14 outputs a monitor voltage (FB monitor) indicating the state of the safety drive circuit 14 to the safety controller 10. The semiconductor element 16 generates a monitor voltage to be outputted from the FB monitor output terminal 32. The voltage input terminal 31 is a voltage input terminal, through which a voltage for causing the semiconductor element 16 to generate a monitor voltage is inputted to the semiconductor element 16. In this embodiment, the voltage input terminal 31 is connected to a constant voltage source. Note that the safety drive circuit 14 outputs a FB monitor from the FB monitor output terminal 32, before respective output signals (safety outputs) from the safety controller 10 are inputted to the safety input (1) terminal and the safety input (2) terminal of the safety drive circuit 14, as will be described in detail.

The relay 17 includes an a-contact 17a, a b-contact 17b, and a coil 17c. The a-contact 17a and the b-contact 17b are mechanically restricted, such that they operate in relation to each other in a complementary manner. In this embodiment, the expression "complementary manner" indicates a state where one of the a-contact 17a and the b-contact 17b is "opened" when the other is "closed". Specifically, when the a-contact 17a is closed, the b-contact 17b is opened. Meanwhile, when the a-contact 17a is opened, the b-contact 17b is closed. Accordingly, both of the a-contact 17a and the b-contact 17b are not closed at the same time. In general, such a structure is also called a "force guided contact structure". Thus, any given relay is applicable to the relay 17, as long as being equipped with the force guided contact structure.

The a-contact 17a corresponds to a "first contact of a first relay" according to the present invention. The b-contact 17b corresponds to a "second contact of the first relay" according to the present invention. The coil 17c corresponds to a "first coil of the first relay" according to the present invention.

The a-contact 17a is electrically connected to the FB output terminal 21 and the FB input terminal 22 of the safety controller 10. The b-contact 17b is electrically connected to the safety output (1) terminal 23 of the safety controller 10 and the safety input (1) terminal 33 of the safety drive circuit 14. An end of the coil 17c is electrically connected to the FB monitor output terminal 32 of the safety drive circuit 14. Herein, the expression "electrical connection" includes not only a direct connection but also a connection through, for example, a wire.

The relay 18 includes a b-contact 18b and a coil 18c. One end of the b-contact 18b is connected to the other end of the coil 17c of the relay 17, whereas the other end of the b-contact 18b is grounded. In other words, the coil 17c of the relay 17 and the b-contact 18b of the relay 18 are connected in series to one another between the FB monitor output terminal 32 of the safety drive circuit 14 and the ground. One end of the coil 18c is connected to the auxiliary output terminal 25 of the safety controller 10, whereas the other end of the coil 18c is connected to the ground. In other words, the coil 18c is electrically connected between the auxiliary output terminal 25 of the safety controller 10 and the ground.

For the relay 18, the force guided contact structure is not essential, and any general-purpose relay can be given as an example thereof. The b-contact 18b corresponds to a "third contact of a second relay" according to the present invention, and the coil 18c corresponds to a "second coil of the second relay" according to the present invention.

According to the configuration illustrated in FIG. 1, only the a-contact 17a of the relay 17 is provided in the feedback loop of the safety controller 10, namely, on a route between the FB output terminal 21 and the FB input terminal 22 of the safety controller 10. The resistance of the a-contact 17a is much smaller than the ON-resistance of the semiconductor element 16. Accordingly, there is no substantial factor in a voltage drop across the above feedback loop.

The relay 18 is driven by the auxiliary output that is synchronized with the safety output of the safety controller 10. The relay 17 is driven by the b-contact 18b of the relay 18 and the semiconductor element 16 of the safety drive circuit 14 (namely, the FB monitor output of the safety drive circuit 14).

In this embodiment, it is only necessary to provide a b-contact of a relay equipped with the force guided contact structure in a connection between at least one of two safety output terminals of the safety controller 10 and a safety input terminal of the safety drive circuit 14 which corresponds to the at least one safety output terminal. Accordingly, as opposed to the configuration illustrated in FIG. 1, the b-contact 17b of the relay 17 may be provided between the safety output (2) terminal 24 of the safety controller 10 and the safety input (2) terminal 34 of the safety drive circuit 14. Alternatively, in the configuration illustrated in FIG. 1, a b-contact of another relay equipped with the force guided contact structure may be provided between the safety output (2) terminal 24 of the safety controller 10 and the safety input (2) terminal 34 of the safety drive circuit 14.

FIG. 2 is a view to explain an operation of the safety drive circuit illustrated in FIG. 1. In FIG. 2, a "safety input 1" and a "safety input 2" represent signals to be inputted to the safety input (1) terminal 33 and the safety input (2) terminal 34, respectively, of the safety drive circuit 14. If both safety inputs 1 and 2 for the safety drive circuit 14 are at a high level, the output of the safety drive circuit 14 is permitted. In this case, the FB monitor output is turned off. Otherwise, if either of the safety inputs 1 and 2 for the safety drive circuit 14 is not at a high level, namely, if at least one of them is at a low level, the output of the safety drive circuit 14 is cut off. In this case, the FB monitor output is turned on. The output of the safety drive circuit 14 may be, for example, electricity supplied to the motor 2 from the safety drive circuit 14.

Figure 3:
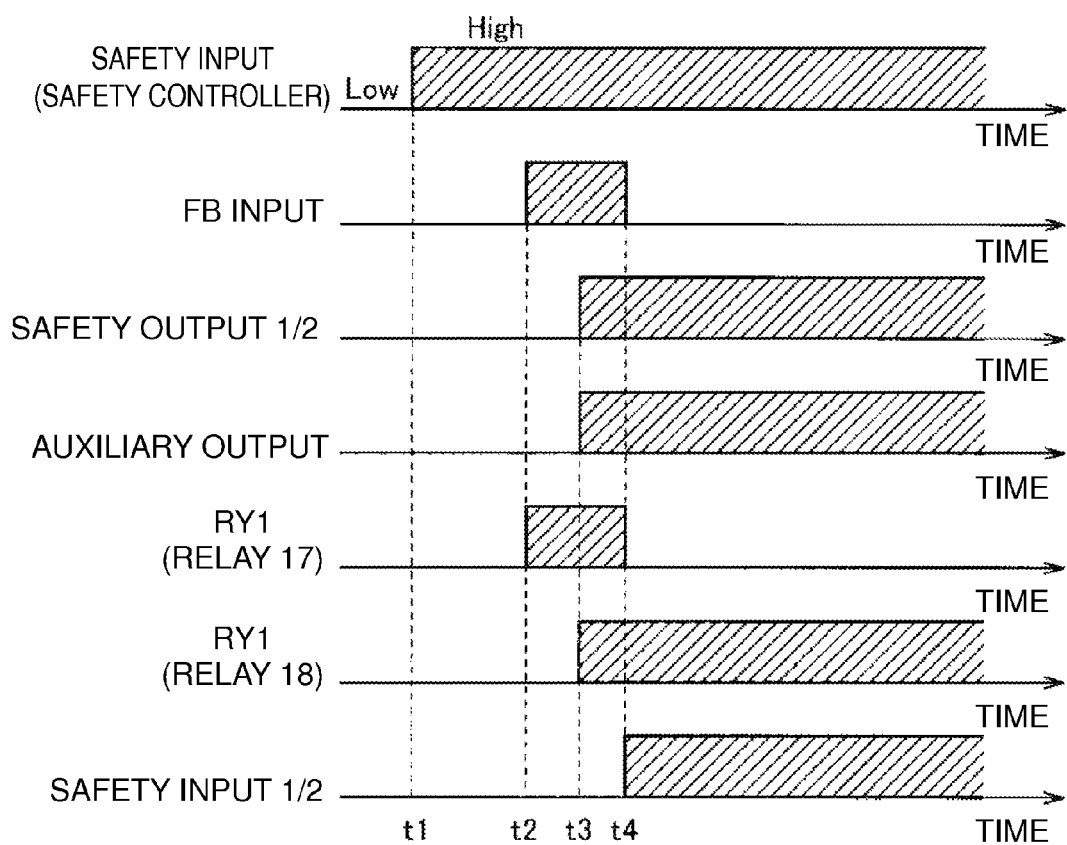
FIG. 3 is a timing chart to explain an operation of the safety control system illustrated in FIG. 1.

FIG. 3 is a timing chart to explain an operation of the safety control system illustrated in FIG. 1. Referring to FIGS. 1 and 3, first, in an initial state (or a state prior to a time t1), the safety output 1 and the safety output 2 of the safety controller 10 (which are described collectively as a "safety output 1/2" in FIG. 3) are both at a low level. Although not illustrated in FIG. 3, because the safety output 1/2 is at the low level, the FB monitor output is in an ON state. Thus, in the safety drive circuit 14, the semiconductor element 16 is in an ON state, and the FB monitor output terminal 32 outputs a monitor voltage.

Because the auxiliary output of the safety controller 10 is at a low level, no current flows through the coil 18c. As a result, the b-contact 18b of the relay 18 (RY2) is closed. This causes a current to flow from the FB monitor output terminal 32 of the safety drive circuit 14 to the coil 17c of the relay 17 (RY1) and the b-contact 18b of the relay 18. Due to the current flowing through the coil 17c, the relay 17 is turned on.

At a time t1, next, a signal (safe input) which is inputted to the safety input terminal 26 of the safety controller 10 from the input apparatus 11 becomes a high level. Concretely, in response to a user's operation with the input apparatus, the safety input becomes a high level. Note that in this embodiment, the expression "a signal becomes a high level" means that a signal is being output. This will apply to the following description.

At a time t2, subsequently, the a-contact 17a of the relay 17 is closed. As a result, the feedback loop is closed. Accordingly, a signal (FB input) that is inputted to the FB input terminal 22 of the safety controller 10 becomes a high level. This FB input of the high level causes the safety output 1/2 of the safety controller 10 to become a high level at a time t3. The auxiliary output becomes a high level in synchronization with the safety output 1/2. This auxiliary output becoming the high level causes a current to flow through the coil 18c of the relay 18. Following this, the relay 18 is turned on.

The turn-on of the relay 18 causes the b-contact 18b to be opened. As a result, no current flows through the coil 17c of the relay 17, which causes the relay 17 to be turned off at a time t4. The turn-off of the relay 17 causes the a-contact 17a and the b-contact 17b to be opened and closed, respectively. Therefore, the safety input 1/2 that is inputted to the safety drive circuit 14 becomes a high level. This safety input 1/2 of the high level causes the semiconductor element 16 of the safety drive circuit 14 to be turned off. As a result, the FB monitor output is turned off.

Note that in FIG. 3, the marks of times t1, t2, t3 and t4 are away from one another, for better understanding of the sequence of the operations. However, these operations are performed at substantially the same timing.

Figure 15:
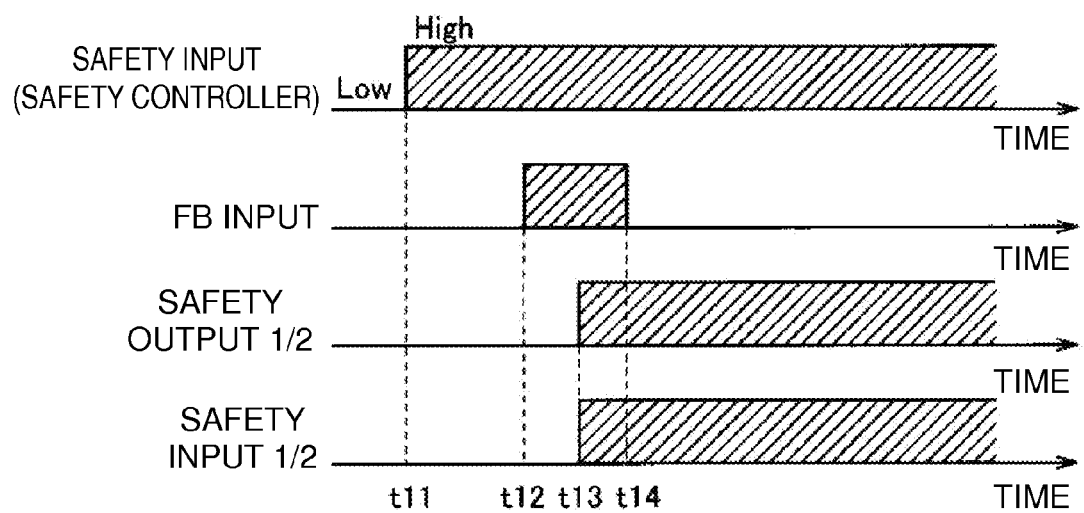
FIG. 15 is a timing chart to explain an operation of the safety control system illustrated in FIG. 14.

As can be understood from the comparison between the timing charts of FIGS. 3 and 15, the operation of the safety control system according to this embodiment is basically the same as that of a typical safety control system. Specifically, after the FB input becomes a high level, the safety output 1/2 becomes a high level. The safety output 1/2 of the high level causes the safety input 1/2 to become a high level. Therefore, it is possible to apply an existing safety controller and safety drive circuit to the safety control system according to this embodiment.

According to this embodiment, there is no factor in a voltage drop across the FB loop created by the safety controller 10. Accordingly, in the case where a plurality of safety drive circuits are connected to a single safety controller, the amount of the voltage drop arising in the FB loop is smaller than that in a typical configuration (see FIG. 16). This enables many more safety drive circuits to be connected to a single safety controller, in comparison with a typical configuration. Consequently, it is possible to increase the number of safety drive circuits which a single safety controller can monitor.

Figure 4:
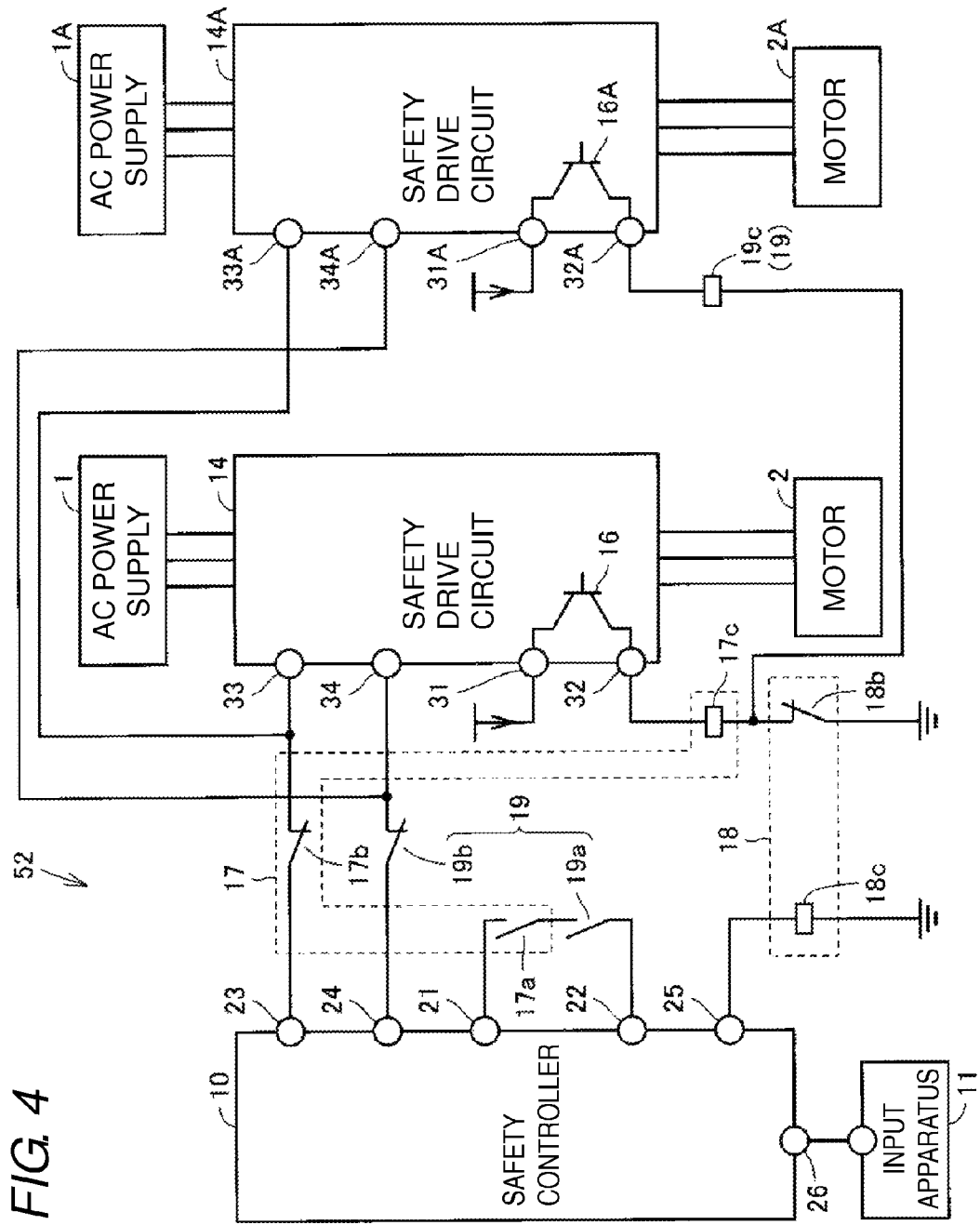
FIG. 4 is a view illustrating a configuration of a safety control system according to the first embodiment, in which a plurality of safety drive circuits are connected to a single safety controller.

FIG. 4 is a view illustrating a configuration of a safety control system according to the first embodiment, in which a plurality of safety drive circuits are connected to a single safety controller. Referring to FIGS. 1 and 4, the safety control system 52 differs from the safety control system 51 in further including a safety drive circuit 14A and a relay 19. The safety drive circuit 14A is configured to supply AC electricity to a motor 2A from an AC power supply 1A, or to cut off the AC electricity thereto. Note that in FIG. 4, the AC power supplies 1 and 1A are illustrated, but instead, a single AC power supply may supply AC electricity to the motors 2 and 2A.

The relay 19 includes an a-contact 19a, a b-contact 19b, and a coil 19c. Similar to the relay 17, the a-contact 19a and the b-contact 19b are mechanically restricted, such that they operate in relation to each other.

The safety drive circuit 14A has a configuration that is the same as that of the safety drive circuit 14. In more detail, the safety drive circuit 14A includes a semiconductor element 16A, a voltage input terminal 31 A, a FB monitor output terminal 32A, a safety input (1) terminal 33A, and a safety input (2) terminal 34A.

The a-contact 17a of the relay 17 and the a-contact 19a of the relay 19 are electrically connected in series to one another between the FB output terminal 21 and the FB input terminal 22 of the safety controller 10. The safety input (1) terminal 33A is connected to the b-contact 17b of the relay 17, together with the safety input (1) terminal 33 of the safety drive circuit 14. The safety input (2) terminal 34A is connected to the b-contact 19b of the relay 19, together with the safety input (2) terminal 34 of the safety drive circuit 14.

Specifically, the b-contact 17b of the relay 17 is electrically connected between a signal output terminal (or the safety output (1) terminal 23) of the safety controller 10 and a signal input terminal (or the safety input (1) terminal 33) of the safety drive circuit 14 which corresponds to the relay 17. Meanwhile, the b-contact 19b of the relay 19 is electrically connected between a signal output terminal (or the safety output (2) terminal 24) of the safety controller 10 and a signal input terminal (or the safety input (2) terminal 34A) of the safety drive circuit 14A which corresponds to the relay 19. Note that the b-contact 19b of the relay 19 may be inserted into a route that electrically connects the safety input (1) terminal 33 to the safety input (1) terminal 33A.

One end of the coil 19c is connected to the FB monitor output terminal 32A of the safety drive circuit 14A, whereas the other end of the coil 19c is connected to the b-contact 18b of the relay 18. Accordingly, the coils 17c and 19c are connected in parallel to the b-contact 18b of the relay 18.

The operation of the safety control system 52 illustrated in FIG. 4 is basically the same as that illustrated in FIG. 3. In FIG. 3, it is only necessary to substitute the relays 17 and 19 for the RY1, and substitute the safety inputs 1/2 of the safety drive circuits 14 and 14A for the safety input 1/2.

Although two safety drive circuits are illustrated in FIG. 4, the single safety controller 10 can also monitor three or more safety drive circuits in this embodiment. Relays (in which each pair of the a-contacts and the b-contacts are configured to operate in relation to each other in a mechanical manner), the number of which is the same as the number of the safety drive circuits, are provided, and the a-contacts of these relays are electrically connected in series between the FB output terminal 21 and the FB input terminal 22 of the safety controller 10. Furthermore, the b-contacts of the relays are electrically connected between a signal input terminal (or one of a safety input (1) terminal and a safety input (2) terminal) of a corresponding safety drive circuit and a signal output terminal (or a corresponding one of the safety output (1) terminal 23 and safety input (2) terminal 24) of the safety controller 10. The coils of the above relays are connected in parallel to the b-contact 18b of the relay 18.

Figure 14:
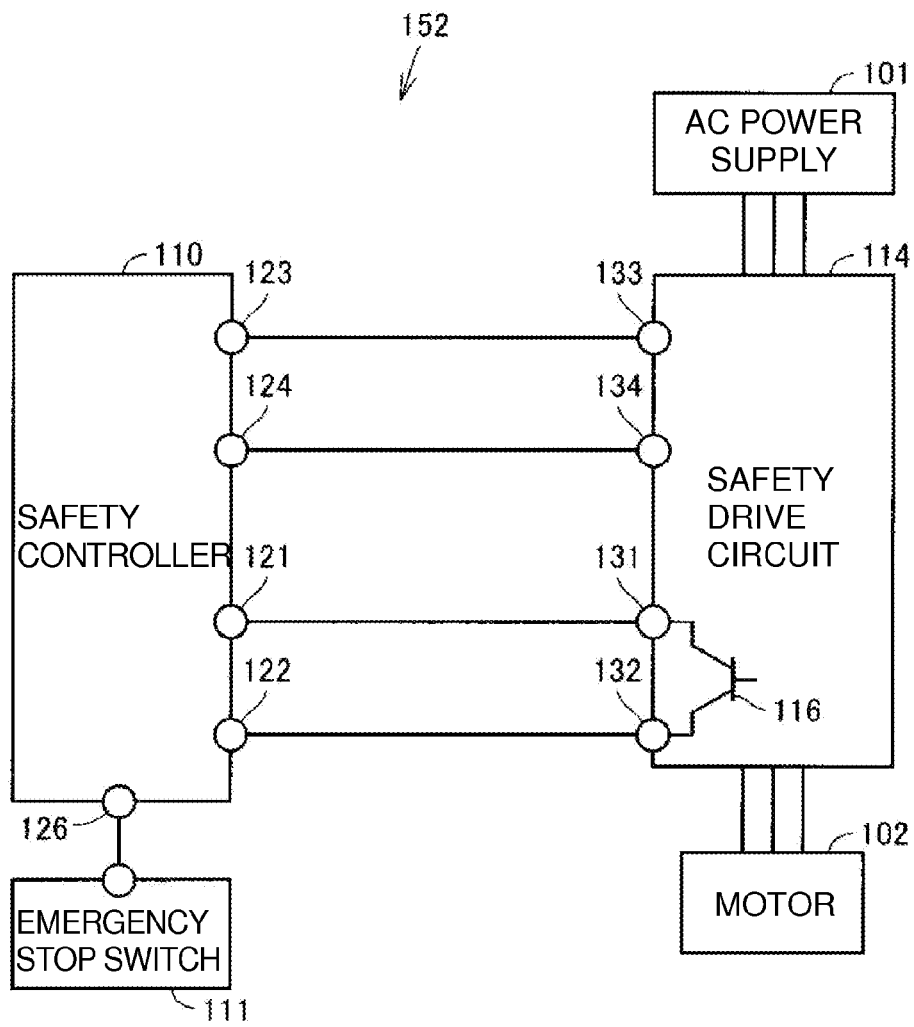
FIG. 14 is a view to more concretely explain a connection between a safety controller and the safety drive circuit illustrated in FIG. 13.
Figure 16:
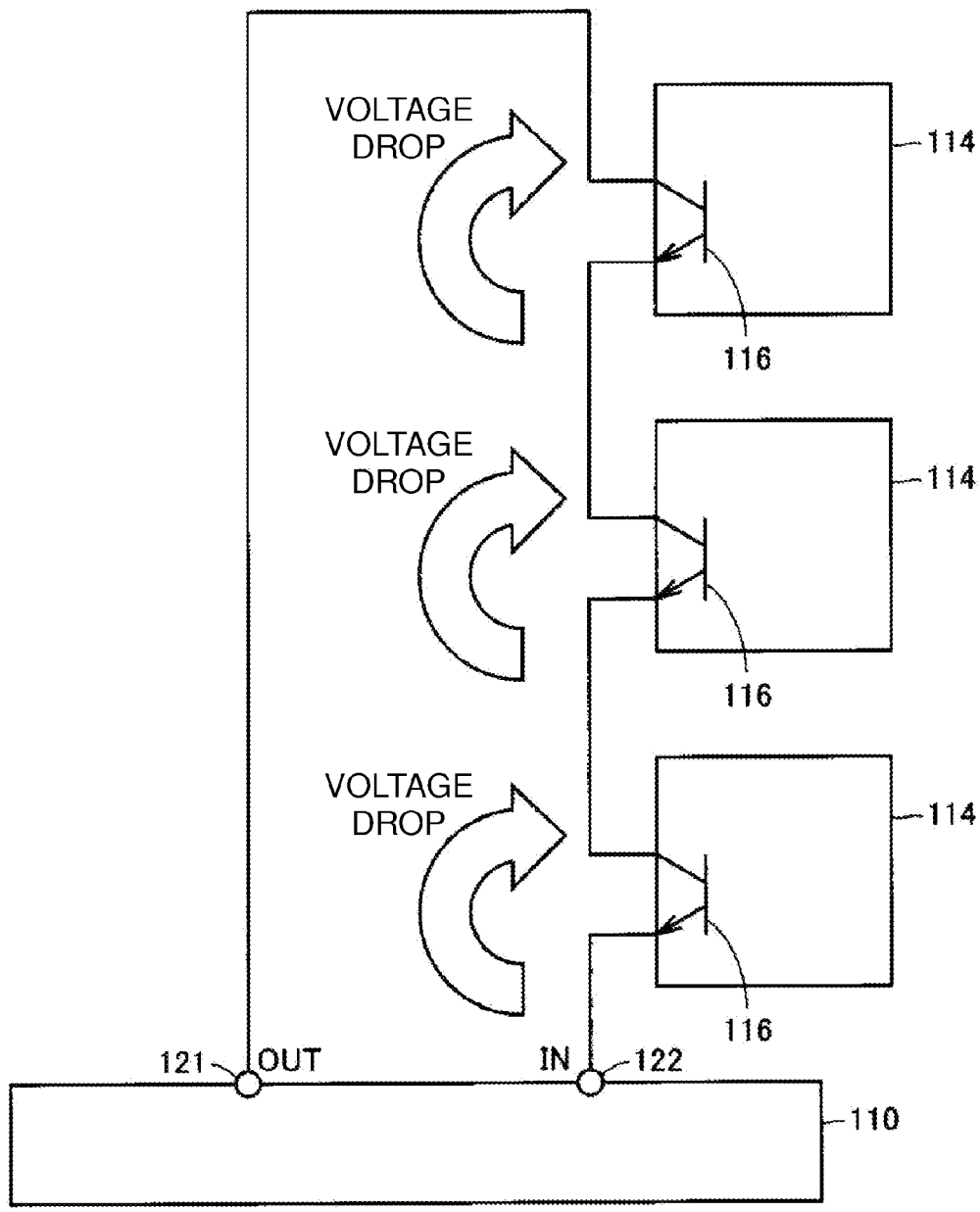
FIG. 16 is a view to explain a disadvantage arising when a feedback loop is created by the semiconductor elements of the safety drive circuits that are connected in series to one another.

According to a typical configuration, such as that illustrated in FIGS. 14, 16, etc., due to the input specifications (a voltage of a high level) for the FB input terminal 122 of the safety controller 110 and the voltage drop of the FB monitor output in the safety drive circuit, only a limited number of safety drive circuits can be connected to a single safety controller. Accordingly, in order to execute safety control over many more safety drive circuits, it is necessary for the user to prepare a plurality of safety controllers and to individually connect these safety controllers to the respective safety drive circuits. In this configuration, disadvantageously, a mechanism or a method is required for causing the plurality of safety controllers to operate in synchronization with one another.

In contrast, according to the first embodiment, simply by adding one or more relays, a single safety controller can monitor and control much more safety drive circuits than those in a typical configuration. Thus, with the first embodiment, a configuration in which a single safety controller monitors many more safety drive circuits can be simply constructed at a low cost.

In this embodiment, the relays 17 and 19 are used, each of which is mechanically restricted such that the a-contact and the b-contact operate in relation to each other. The a-contact of each relay is provided between the FB output terminal 21 and the FB input terminal 22 of the safety controller 10. Meanwhile, the b-contact of each relay is provided between a safety output terminal of the safety controller 10 and a safety input terminal of a corresponding safety drive circuit. With the relays configured above, the failure of the relays 17 and 19 can be found out.

Figure 11:
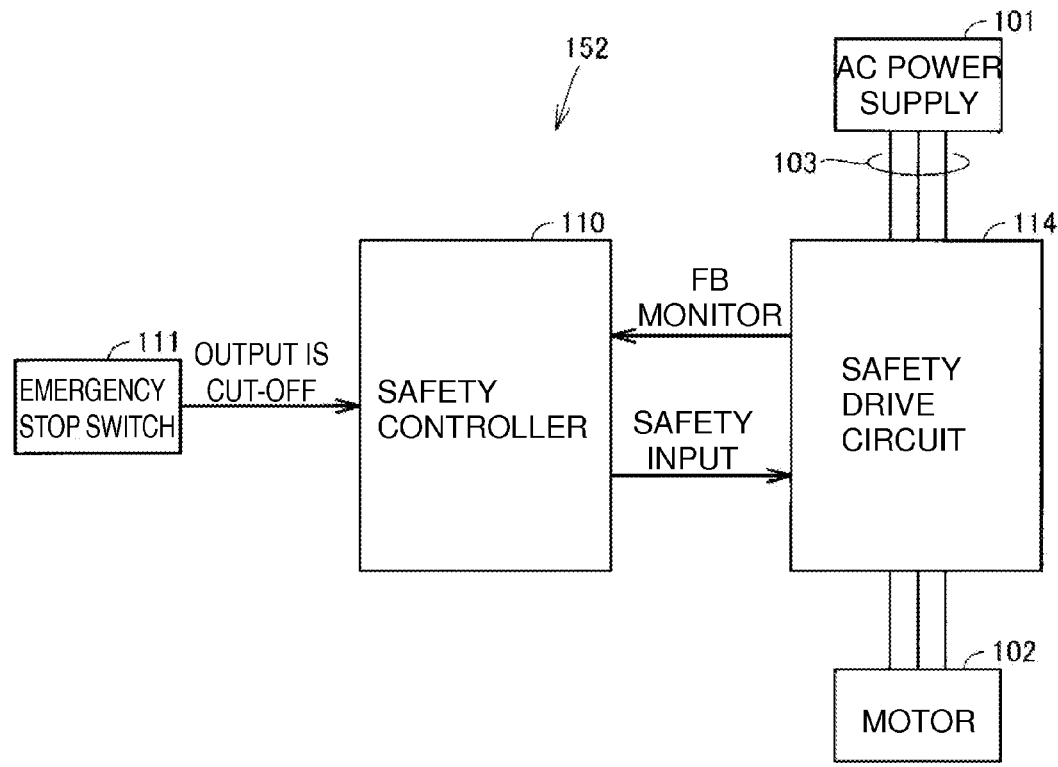
FIG. 11 is a view illustrating another example of a configuration of a typical safety control system.
Figure 12:
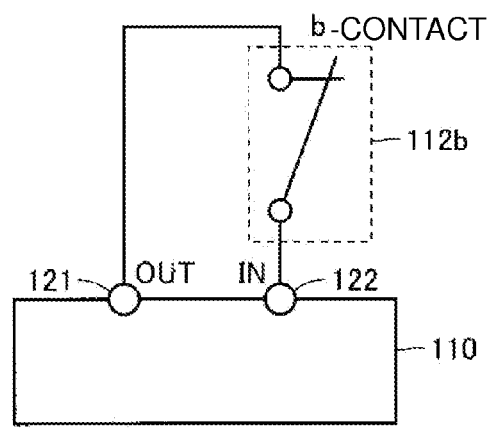
FIG. 12 is a view to explain a feedback loop for controlling a contactor.
Figure 13:
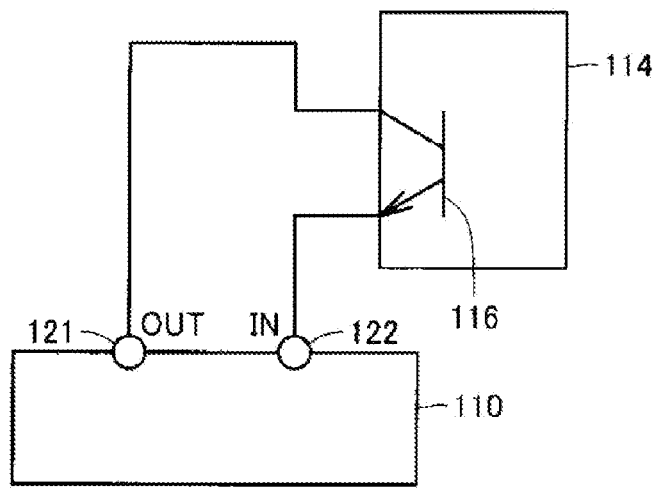
FIG. 13 is a view to explain a feedback loop in a safety drive circuit.

As illustrated in FIG. 11, the FB monitor is basically used to find out the welding of the a-contacts 112a and 113a in the contactors 112 and 113, respectively. Moreover, when the drive output of the safety drive circuit 114 fails, the FB monitor output is maintained in an OFF state, thus preventing the safety output of the safety controller 110 from being maintained in an ON state and avoiding the dangerous condition. If the failure, such as the welding, of the a-contacts 112a and 113a cannot be detected, the safety output of the safety controller 110 may be turned on even when the FB monitor output is maintained in an OFF state.

In contrast, with the first embodiment, the b-contact 17b of the relay 17 (or the b-contact 19b of the relay 19) is forcibly opened when the a-contact 17a of the relay 17 (or the a-contact 19a of the relay 19) is welded. As a result, at least one of the safety inputs in the safety drive circuit (14 or 14A) is turned off. In this case, the safety drive circuit (14 or 14A) does not operate, so that the power source (or the motor 2) does not operate, either.

Meanwhile, when the b-contact 17b of the relay 17 (or the b-contact 19b of the relay 19) is welded, the a-contact 17a of the relay 17 (or the a-contact 19a of the relay 19) is opened. In this case, the FB loop created by the safety controller 10 is opened, so that both safety outputs 1 and 2 of the safety controller 10 are at a low level. As a result, the output of the safety drive circuit 14 (or 14A) is cut off.

The relay 18 may be a general-purpose relay. The possible failure of the relay 18 can be an ON or OFF failure. However, the output of the safety drive circuit 14 (or 14A) is cut off, even when any of an ON and OFF failures occurs.

Assuming a case where an ON failure occurs in the relay 18, the relay 18 is kept ON. As a result, the relay 17 (or 19) is maintained in an ON state, whereas the b-contact (17b or 19b) of the relay 17 (or 19) is maintained being opened. In this case, a safety output that is transferred from the safety controller 10 to the safety drive circuit (14 or 14A) is cut off. In this way, in each of the safety drive circuits (14 and 14A), both safety inputs 1 and 2 are not at a high level at the same time. Consequently, the outputs of the safety drive circuits (14 and 14A) are cut off.

Next, assuming a case where an OFF failure occurs in the relay 18, the relay 18 is kept OFF. As a result, the relay 17 (or 19) is maintained in an OFF state, whereas the a-contact (17a or 19a) of the relay 17 (or 19) is maintained being opened. Accordingly, the FB loop created by the safety controller 10 is opened. In this case, the safety outputs 1 and 2 of the safety controller 10 become a low level. Consequently, the outputs of the safety drive circuits (14 and 14A) are cut off.

(Second Embodiment)

Figures 5, 6:
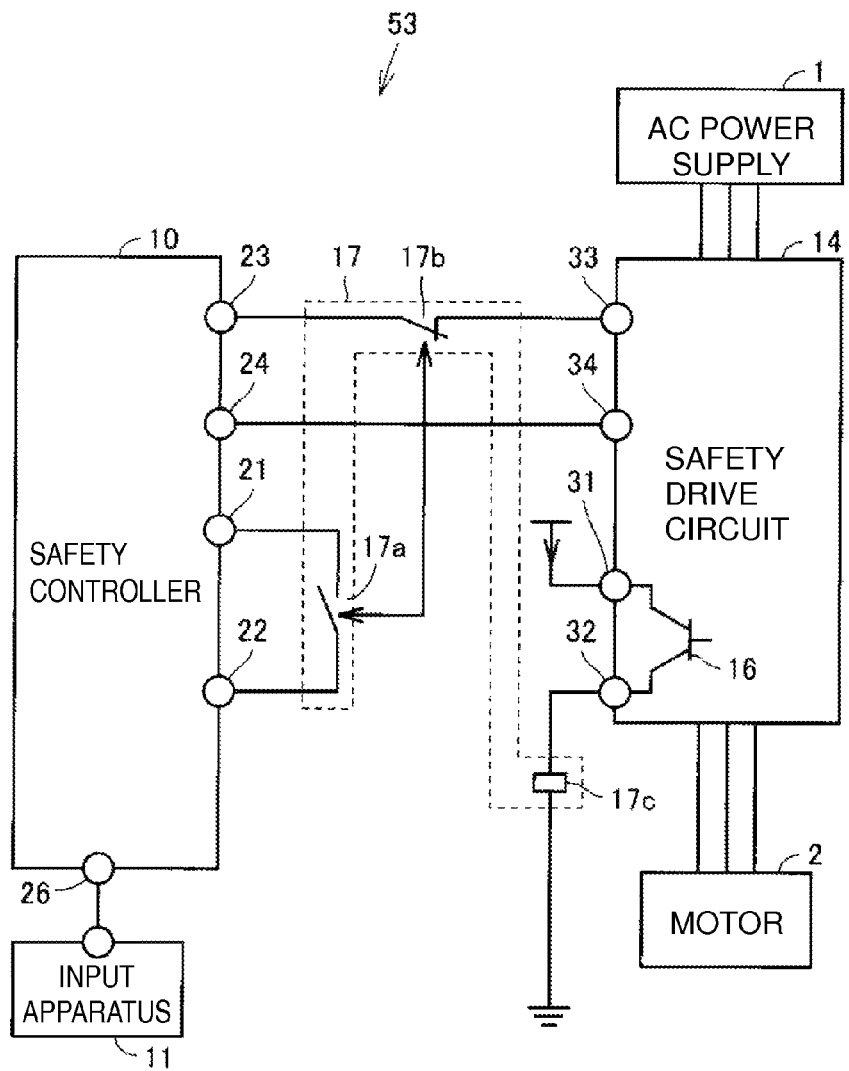
FIG. 5 is a view illustrating an example of a configuration of a safety control system according to a second embodiment of the present invention.
FIG. 6 is a view to explain an operation of a safety drive circuit illustrated in FIG. 5.

FIG. 5 is a view illustrating an example of a configuration of a safety control system according to a second embodiment of the present invention. Referring to FIGS. 1 and 5, a safety control system 53 according to the second embodiment is different from the safety control system 51 according to the first embodiment, in that the relay 18 is omitted.

The safety controller 10 may be provided with the auxiliary output terminal 25, similar to the first embodiment, but this auxiliary output terminal 25 may be an option in the second embodiment. Therefore, the auxiliary output terminal 25 is not illustrated in FIG. 5. One end of the coil 17c in the relay 17 is connected to the FB monitor output terminal 32 of the safety drive circuit 14. The other end of the coil 17c is grounded. Thus, in this embodiment, the coil 17c is electrically connected between the FB monitor output terminal 32 of the safety drive circuit 14 and the ground. The other part of the configuration which the safety control system 53 according to the second embodiment has is the same as corresponding part of the configuration which the safety control system 51 according to first embodiment has. Accordingly, the subsequent explanation will be skipped.

FIG. 6 is a view to explain an operation of the safety drive circuit illustrated in FIG. 5. Referring to FIGS. 2 and 6, in the second embodiment, when one of the "safety input 1" and the "safety input 2" is at a high level and the other thereof is at a low level, the FB monitor output is turned off. In terms of this feature, the second embodiment differs from the first embodiment.

Figure 7:
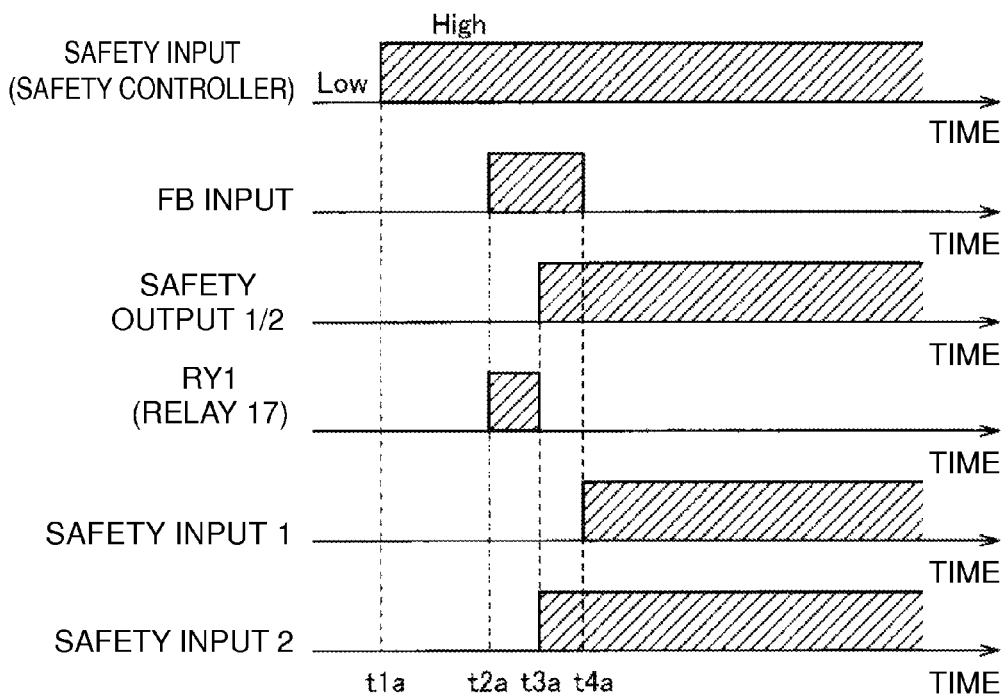
FIG. 7 is a timing chart to explain an operation of the safety control system illustrated in FIG. 5.

FIG. 7 is a timing chart to explain an operation of the safety control system illustrated in FIG. 5. Referring to FIGS. 5 and 7, first, in an initial state (or a state prior to a time t1a), the safety output 1 and the safety output 2 of the safety controller 10 (which are described collectively as a "safety output 1/2" in FIG. 7) are both at a low level. Although not illustrated in FIG. 7, because the safety output 1/2 is at the low level, the FB monitor output is in an ON state.

Because the FB monitor output is in the ON state, a current flows from the monitor output terminal 32 of the safety drive circuit 14 to the coil 17c of the relay 17(RY1), which turns on the relay 17.

At a time t1a, next, a safety input which is inputted to the safety input terminal 26 of the safety controller 10 becomes a high level. At a time t2a, subsequently, the a-contact 17a of the relay 17 is closed. Accordingly, a signal (FB input) that is inputted to the FB input terminal 22 of the safety controller 10 becomes a high level. This FB input becoming the high level causes the safety output 1/2 of the safety controller 10 to become a high level at a time t3a. Because the a-contact 17a of the relay 17 is closed, the b-contact 17b of the relay 17 is opened. Accordingly, the safety input 1 of the safety drive circuit 14 is at a low level at the time t3a. Meanwhile, the safety input 2 of the safety drive circuit 14 is at a high level.

The safety inputs 1 and 2 becoming the low and high levels, respectively, in the safety drive circuit 14 cause the FB monitor output of the safety drive circuit 14 to be turned off. As a result, no current flows through the coil 17c of the relay 17, so that the relay 17 is turned off. At a time t4a, the a-contact 17a of the relay 17 is opened but the b-contact 17b thereof is closed. As a result, the safety input 1 which is inputted to the safety drive circuit 14 becomes a high level. After the time t4a, the safety inputs 1 and 2 are kept at the high level. When both safety inputs 1 and 2 are at a high level, the FB monitor output is at a low level. Thus, the FB monitor output is kept at the low level even after the time t4a.

Figure 8:
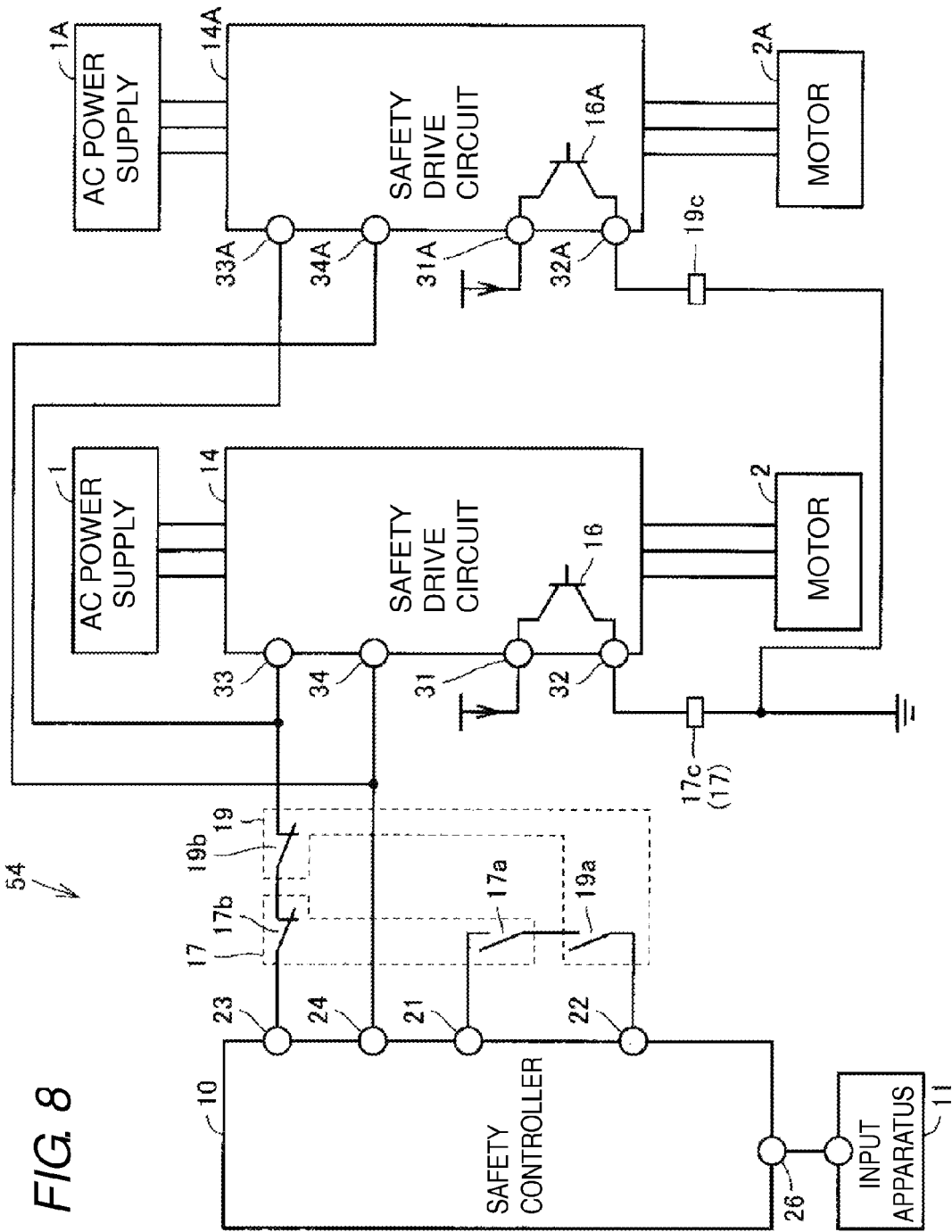
FIG. 8 is a view illustrating a configuration of a safety control system according to the second embodiment, in which a plurality of safety drive circuits are connected to a single safety controller.
Figure 9:
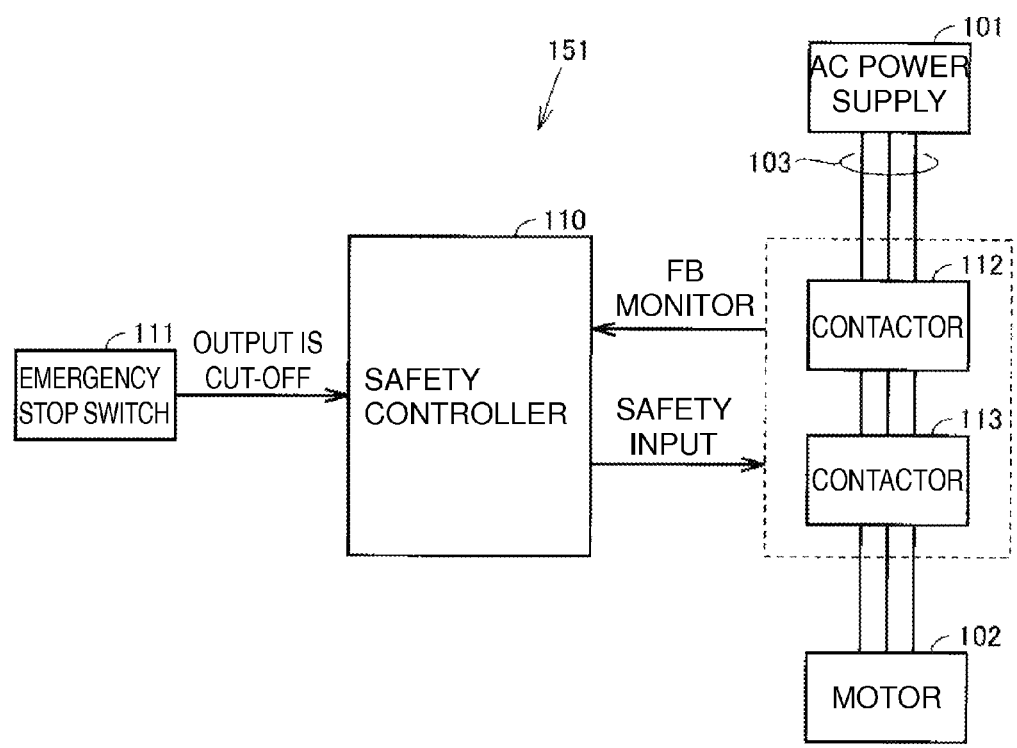
FIG. 9 is a view illustrating an example of a configuration of a typical safety control system.
Figure 10:
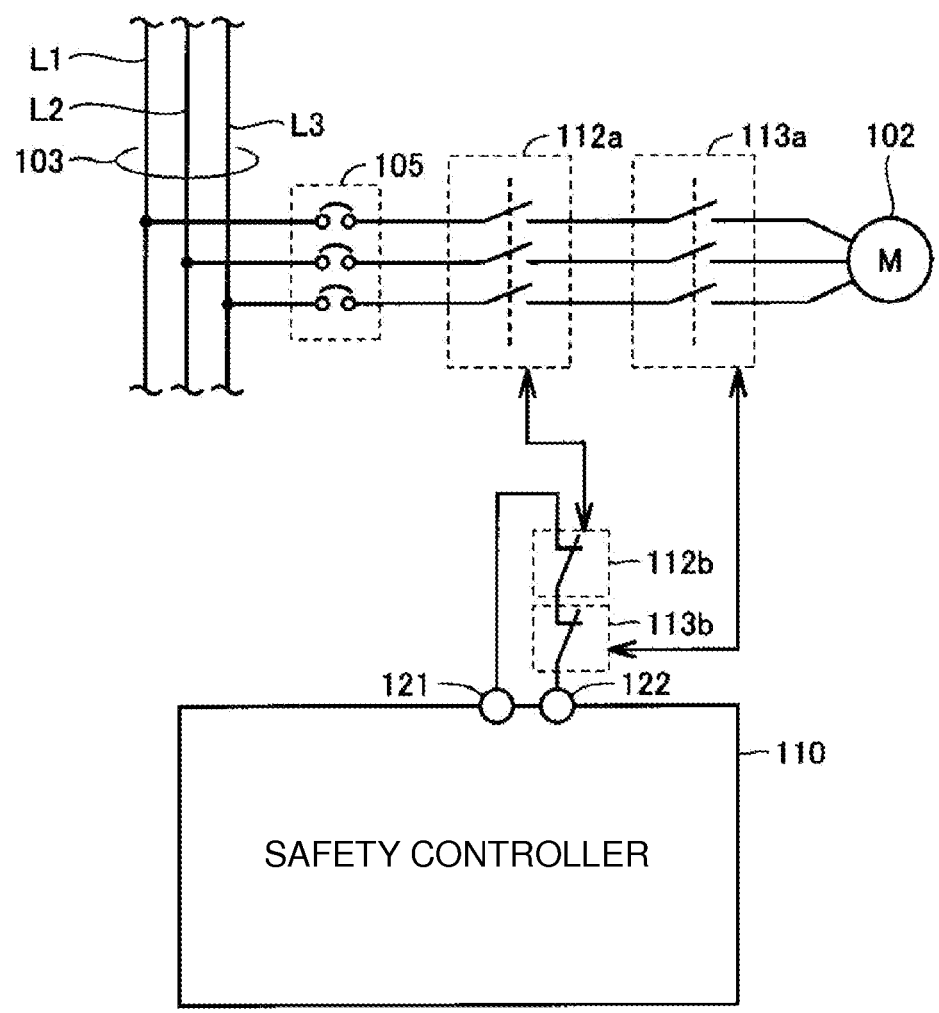
FIG. 10 is a view to concretely explain a configuration for monitoring contactors.

FIG. 8 is a view illustrating a configuration of a safety control system according to the second embodiment, in which a plurality of safety drive circuits are connected to a single safety controller. Referring to FIGS. 5 and 8, a safety control system 54 differs from the safety control system 53 in further including the safety drive circuit 14A and the relay 19. Note that because the configuration of the safety drive circuit 14A is the same as that illustrated in FIG. 4, the subsequent description will be skipped. Likewise, because the configuration of the relay 19 is the same as that illustrated in FIG. 4, the subsequent description will be skipped.

In the configuration illustrated in FIG. 8, the b-contact 17b of the relay 17 and the b-contact 19b of the relay 19 are connected in series to one another between the safety output (1) terminal 23 of the safety controller 10 and the safety input (1) terminal (33 or 33A) of the safety drive circuit (14 or 14A). The coil 19c of the relay 19 is electrically connected to the FB monitor output terminal 32A of the safety drive circuit 14A and the ground. Note that in the configuration illustrated in FIG. 8, the coil 17c of the relay 17 and the coil 19c of the relay 19 are connected to the ground together, but may be connected to the ground separately.

As can be seen from the comparison between the respective configurations illustrated in FIGS. 5 and 8, the configuration according to the second embodiment can make the relay 18 unnecessary, even when a plurality of safety drive circuits are connected to a single safety controller.

As opposed to the configuration illustrated in FIG. 8, the b-contact 17b of the relay 17 and the b-contact 19b of the relay 19 may be connected in series to one another between the safety output (2) terminal 24 of the safety controller 10 and the safety input (2) terminal (34 or 34A) of the safety drive circuit (14 or 14A). However, note that in the second embodiment, the safety drive circuits (14 and 14A) operate in accordance with the relationship illustrated in FIG. 7. Accordingly, it is necessary to connect one of the two safety input terminals in each of the safety drive circuits (14 and 14A) to a corresponding safety output terminal of the safety controller 10 without a b-contact therebetween, namely, directly.

The second embodiment can produce the same effect as the first embodiment does. Thus, a configuration in which a single safety controller monitors many more safety drive circuits can be simply constructed at a low cost.

Furthermore, the second embodiment can decrease the number of relays used therein, in comparison with the first embodiment.

It should be interpreted that the embodiments having been disclosed herein are just examples and not limitative, in all respects. The scope of the present invention is defined by not the above description but the claims. In addition, the present invention is intended to include all possible modifications and variations without departing from the sprit or scope of the claims and equivalents thereof.

What is claimed is:

1. A safety control system comprising:
  a controller; and
  at least one drive circuit configured to drive a power source;
  the controller including:
  a feedback output terminal and a feedback input terminal which create a feedback loop that allows the controller to monitor a state of the at least one drive circuit; and
  a signal output terminal through which the controller outputs an output signal for permitting the at least one drive circuit to drive the power source;
  the drive circuit including:
  a signal input terminal through which the output signal outputted from the signal output terminal of the controller is inputted to the drive circuit;
  a monitor output terminal through which the drive circuit outputs a monitor voltage indicating the state of the drive circuit from the drive circuit to the controller;
  a semiconductor element which generates the monitor voltage to be outputted through the monitor output terminal; and
  a voltage input terminal through which a voltage for causing the semiconductor element to generate the monitor voltage is inputted to the semiconductor element;
  wherein the drive circuit outputs the monitor voltage through the monitor output terminal, before the output signal from the controller is inputted to the signal input terminal, wherein the safety control system further includes:
at least one first relay that includes a first coil, and a first contact and a second contact which both are operated in relation to each other in a complementary manner, the first relay closing the first contact and opening the second contact when a current flows through the first coil, the first relay opening the first contact and closing the second contact when no current flows through the first coil,
wherein the first contact of the first relay is electrically connected to the feedback output terminal and the feedback input terminal of the controller,
wherein the second contact of the first relay is electrically connected to the signal output terminal of the controller and the signal input terminal of the drive circuit,
wherein the first coil of the first relay is electrically connected to the monitor output terminal of the drive circuit;
wherein the controller further includes an auxiliary output terminal through which the controller outputs an auxiliary output signal that is synchronized with the output signal,
wherein the safety control system further includes:
a second relay including a second coil, and a third contact which is opened when a current flows through the second coil but is closed when no current flows through the second coil,
wherein the first coil of the first relay and the third contact of the second relay are electrically connected in series to one another between the monitor output terminal of the drive circuit and a ground, and
wherein the second coil of the second relay is electrically connected to the auxiliary output terminal of the controller and the ground.

2. The safety control system according to claim 1, wherein after confirming that the feedback loop has been closed, the controller outputs the output signal and the auxiliary output signal through the signal output terminal and the auxiliary output terminal, respectively.

3. The safety control system according to claim 1, wherein the at least one drive circuit includes a plurality of drive circuits,
the at least one first relay includes a plurality of first relays provided corresponding to the plurality of drive circuits,
the respective first contacts of the plurality of the first relays are electrically connected in series to one another between the feedback output terminal and the feedback input terminal of the controller,
each of the second contacts of the plurality of the first relays is electrically connected to the signal output terminal of the controller and the signal input terminal of one of the plurality of drive circuits which corresponds to each first relay, and
the respective first coils of the plurality of the first relays are electrically connected to the monitor output terminals of the corresponding drive circuits, and are connected in parallel to the third contact of the second relay.

4. The safety control system according to claim 1, wherein the at least one drive circuit includes a plurality of drive circuits,
the at least one first relay includes a plurality of first relays provided corresponding to the plurality of drive circuits,
the respective first contacts of the plurality of the first relays are electrically connected in series to one another between the feedback output terminal and the feedback input terminal of the controller, and
the second contacts of the plurality of the first relays are electrically connected in series to one another, and each second contact is electrically connected to the signal output terminal of the controller and the signal input terminal of one of the drive circuits which corresponds to each first relay.

* * * * *